No. 772,537. PATENTED OCT. 18, 1904.
W. L. SAUNDERS.
HUB AND AXLE FOR VEHICLES.
APPLICATION FILED OCT. 27, 1902.
NO MODEL.

Witnesses.
Edward S. Featherstonhaugh
Frank C. Askwith

Inventor
W. L. Saunders
by Featherstonhaugh
attys

No. 772,537.                                                    Patented October 18, 1904.

UNITED STATES PATENT OFFICE.

WILLIAM L. SAUNDERS, OF BRIDGEWATER, CANADA.

HUB AND AXLE FOR VEHICLES.

SPECIFICATION forming part of Letters Patent No. 772,537, dated October 18, 1904.

Application filed October 27, 1902. Serial No. 129,035. (No model.)

*To all whom it may concern:*

Be it known that I, WILLIAM L. SAUNDERS, trader, of the town of Bridgewater, in the county of Lunenberg, in the Province of Nova Scotia, Dominion of Canada, have invented certain new and useful Improvements in Hubs and Axles for Vehicles, of which the following is a specification.

My invention relates to improvements in hubs and axles for vehicles; and the objects of my invention are to devise a cheap and simply-constructed hub and axle which will be absolutely dust-proof and may be very easily oiled without removing the wheel from the axle or without the necessity of using a jack when oiling and also to reduce the danger in cases of collision and to reduce the number of times which it is necessary to oil the vehicle under ordinary circumstances; and it consists, essentially, of an axle having a tapered end extending into, but not through, the hub, a suitable collar being provided and secured to the axle, and a nut secured to the hub, said nut and collar being designed to act conjointly to prevent the hub from slipping inwardly or outwardly on the axle, a groove being formed in the tapered portion of the axle and a suitable oil-cup communicating therewith, so that the bearings may all be oiled without removing the hub from the axle, said nut having a portion surrounding the axle so closely as to make the entrance of dust to the bearings impossible, and the various parts of the device being constructed and arranged in detail as hereinafter more particularly described.

Figure 1:
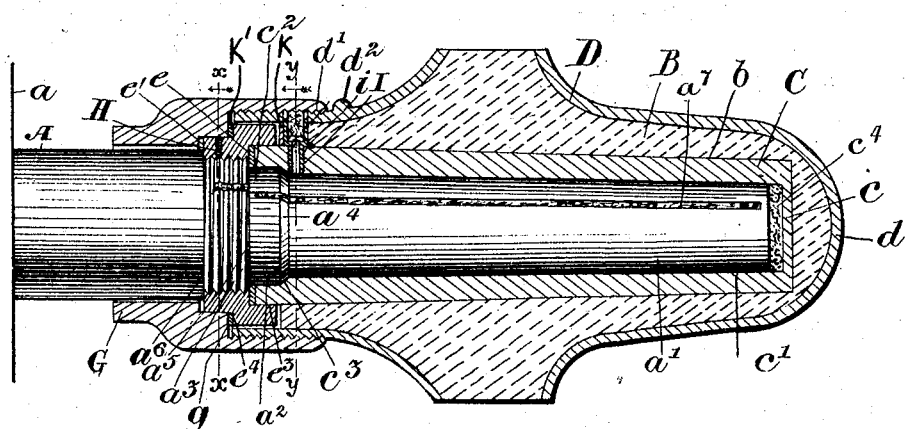
Figure 2:
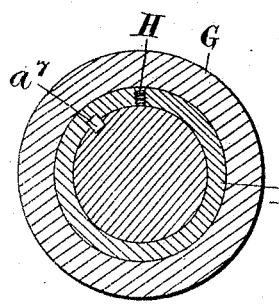
Figure 3:
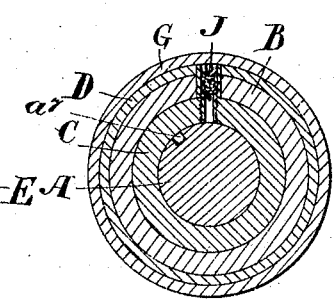
Figure 4:
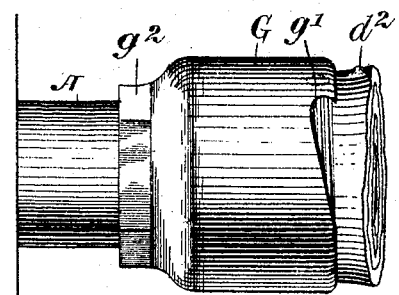
Figure 5:
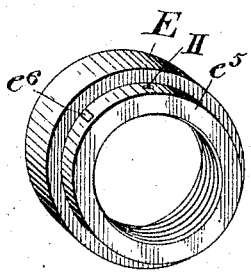
Figures 6, 7:
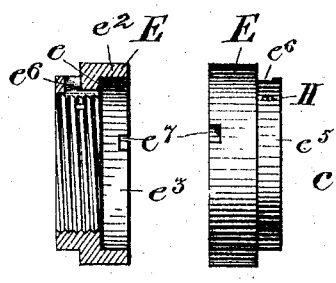
Figures 8, 10:
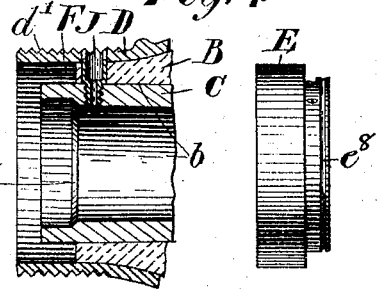
Figure 9:

Figure 1 is a sectional view of the hub and axle. Fig. 2 is a cross-section through Fig. 1 on the line X X. Fig. 3 is a cross-section through Fig. 1 on the line Y Y. Fig. 4 is an elevation of the portion of the device at the inner end of the hub. Fig. 5 is a perspective view of a removable collar employed in the construction of the device. Fig. 6 is a section through the same. Fig. 7 is a side elevation of the said collar. Fig. 8 is a sectional view of the inner portion of the hub, the axle-box, and the steel covering. Fig. 9 is a perspective view of the oil-cup. Fig. 10 is an elevation of an alternative form of the collar.

In the drawings like letters of reference indicate corresponding parts in each figure.

A is the axle of a vehicle, which is secured to the body thereof by any suitable means, the line $a$ being intended to indicate the edge of the portion of the wagon to which the axle is secured. The outer extremity of the axle is tapered at $a'$. At the inner end of this tapered portion an enlarged portion $a^2$ is formed, and inside of this enlarged portion a threaded portion $a^3$ is provided, there being shoulders $a^4$ $a^5$ $a^6$ between the tapered portion and the first enlarged portion, the enlarged portion and the threaded portion, and the threaded portion and the body of the axle, respectively.

B is the wooden portion of the hub. The hub has a central tapered hole $b$, in which the hollow tapered box C is tightly fitted. The outer end $c$ of this box is closed, but the inner end thereof is open. A central hole is formed in the box and is tapered to correspond with the taper of the outer portion $a'$ of the axle. At the inner end of the box C the hole $c'$ is enlarged at $c^2$, thus forming a shoulder $c^3$, which the shoulder $a^4$ on the axle is designed to abut when the hub is in the proper position on the axle. The outside of the wooden portion B of the hub is covered with a steel sheathing or cover D, and the outside end $d$ of this sheathing or cover is rounded off as near as possible to the end of the box C, thus forming a hub which will have a minimum tendency to cause damage in collision with other vehicles, owing to the rounded shape and also owing to the short distance which it projects beyond the wheels. The inner end of the sheathing D extends beyond the wooden portion B of the hub, as shown in Fig. 8, and the sheathing or cover is formed with a thread $d'$ at the inner end.

E is a collar which is screwed on the threaded portion $a^3$ of the axle. This collar has an internal shoulder $e$, which comes in alinement with the shoulder $a^5$ on the axle when the collar is screwed up tight. The inner end of the box C abuts the surface formed conjointly by those two shoulders, and it will thus be seen that the hub will be prevented from moving inwardly on the axle and getting out of place.

It may here be mentioned that when the collar E is screwed up tight in place its inner face $e'$ will abut the shoulder $a^6$ of the axle. The outer circular portion $e^2$ of the collar E extends into the ring-shaped space formed between the sheathing D and the inner end of the wooden portion B of the hub and the outer circumference of the inner end of the box C. The portion $e^3$ of the inner circumference of the collar E is not threaded, but has a plain surface, and this portion is in contact with the outside surface of the box C; but particular attention is called to the fact that the face of the collar E is not in contact with the inner face of the wooden portion of the hub, nor is the outer peripheral surface of the collar in contact with the sheathing D, a space being left between these surfaces to avoid unnecessary friction which would be caused by their being in contact.

G is a nut having an internally-threaded portion designed to engage the corresponding thread $d'$, formed on the inner end of the sheathing D. A shoulder $g$ is formed internally adjacent to the threaded portion thereof, and this shoulder abuts a shoulder $e^4$, which is formed on the outer circumference of the collar E.

It may here be mentioned that the collar E is securely held in position when it is screwed onto the axle by means of a set-screw H, which is screwed through the reduced portion $e^5$ of the collar and presses against the threaded portion of the axle, or, if desirable, a small indentation can be made on the threaded portion of the axle, into which the set-screw can be inserted. In the axle a groove $a^7$ is formed, which extends from a point near the end of the tapered portion $a'$ inwardly to a point near the inner edge of the threaded portion $a^3$. This groove is located, preferably, on the forward side of the axle about one-eighth of the distance from top to bottom thereof. Suitable absorbent material, such as felt or the like, may be placed in this groove for the purpose of retaining the oil and supplying it to the axle when required.

In order to provide the necessary oil, a hole I is bored through the sheathing D, the wooden portion B of the hub, and the box C, the portion $i$ in the box being preferably of smaller diameter than that in the sheathing D and wooden portion B, and this reduced portion is tapped or threaded.

An oil-cup J (shown in perspective detail in Fig. 9) is provided. This oil-cup has a reduced and threaded portion $j$, designed to be screwed into the hole $i$. The upper portion is slightly enlarged and is intended to fit tightly into the enlarged portion of the hole I. Notches $j'$ (see Fig. 9) are formed in the upper edge thereof, so that the cup may be screwed into place or removed therefrom by means of an ordinary screw-driver.

$d^2$ is a projection formed on the sheathing D directly opposite the hole I, in which the oil-cup is inserted. The object of this projection is to indicate the position of the oil-cup. (See Fig. 4.) A notch $g'$ is formed in the nut G, and by turning the nut tightly this notch comes opposite the projection $d^2$, and it will be seen that the oil may be inserted in the cup.

The outer end of the tapered portion of the axle does not quite extend to the outer end of the hole in the box. A space $c^1$ is thus formed, and in this space absorbent material, such as felt, may be placed to absorb or take up the superfluous oil and to give it out again when the bearings become dry. Felt is also placed in the oil-cup J and groove $a^7$ for the purpose of retaining a portion of the oil and also to render the oil-cup dust-proof. The groove $a^7$ extends partly into the collar E, as will be seen on reference to Figs. 2 and 6. It will thus be seen that a portion of the oil will find its way through this groove and up through the duct $e^6$, so as to oil the bearing-surfaces between the nut G and the reduced portion $e^5$ of the collar E.

Suitable means may be employed for turning the various rotatable parts of the device in putting it together or taking it apart. On the nut G for this reason I prefer to employ a hexagonal portion $g^2$, so that the nut may be turned by means of an ordinary wrench. In the collar E, I prefer to provide a notch $e^7$, into which the end of a spanner or other suitable instrument may be inserted.

Having now described the construction of the various parts of the device, I will proceed to point out the advantages which are achieved by the use thereof. It may first be pointed out that it is absolutely impossible for any dust to get into the bearings of the device. Hence the wheels will run very much easier, there will be less wear, and a given amount of oil will last considerably longer. Secondly, it is not necessary to jack up the axles of the wagon in order to oil the bearings, nor is it necessary to remove the wheels. All that need be done is to give the nut G a slight turn, as above described, till the notch $g'$ comes opposite the projection $d^2$, and the spout of the oil-can may then be inserted in the oil-cup and the necessary amount of oil poured in. This oil will spread along the groove $a^7$, thus thoroughly oiling the bearing between the surfaces of the axle and the box, and it will also oil the bearing between the collar and the nut.

It is a considerable advantage to have the collar E removable, as this is a portion of the device which takes up a very large amount of the side pressure and prevents the wheels from moving inwardly or outwardly on the axle, and consequently the shoulders will have a greater tendency to wear it than the other portions of the device. Should this happen, the collar may of course be removed and a new one substituted therefor by simply loosening the set-screw H and unscrewing the collar.

In assembling the parts of the device the nut G is first slipped over the end of the axle. The collar E is then screwed into place and secured by the set-screw H. The hub, with the sheathing D and the box C, is then slipped onto the end of the axle, and the nut G is screwed on the outside of the sheathing. By this means the shoulders $a^4$ and $c^3$ of the axle and box, respectively, are brought into contact. Also the shoulders $e$ and $a^5$ of the axle and collar are brought in contact with the surface at the inner end of the box, and by means of these contacts it will be readily seen that the hub cannot slip inwardly on the axle. Further, the shoulder $g$ of the nut G is brought in contact with or bears against the shoulder $e^4$ of the collar, and this contact prevents the hub from slipping outwardly. At these points of contact I might, if desirable, provide washers K and K', respectively, and it might be pointed out that the distance from the inner face of the nut G from the wagon-body or the portion thereof to which the axle is attached is made sufficiently long to allow of the end being slipped back so that the washer for the rear bearing-shoulder of the collar E may be put in place. The inner surface of the nut G and the circumference of the axle are not sufficiently close together to cause friction between them in turning, but they are made just close enough to prevent the entrance of dust into the bearings.

In Fig. 10 I have shown a view of the collar E with an oil-groove $e^8$ formed around the periphery of the reduced portion, the object of this groove being to retain any superfluous oil which gets to the outer circumference of the nut and to give it out again if the bearings become dry.

I am aware that it is not broadly new to employ a steel coating for the hub, nor is it new to provide an oil-groove in the end of the axle, and I therefore do not claim these features broadly as my invention.

What I claim as my invention is—

1. In combination a hub and axle-box closed at the outer end and open at the inner end and secured in the hub, an axle extending thereinto and having a longitudinal oil-groove formed therein, a collar removably secured to the axle and adapted to abut the inner end of the axle-box, a nut or sleeve threaded on the outside of the hub and having an internal shoulder adapted to abut a rear shoulder on the collar, said hub having an oil-passage penetrating it and the axle-box and adapted to transmit the oil to the oil-groove, and said collar having suitable ducts for transmitting the oil from the oil-groove to the bearing-surfaces between the collar and the axle-box, and between the rear face of the collar and the internal shoulder of the nut as and for the purpose specified.

2. In combination, a hub, an axle-box closed at the outer end and open at the inner end secured in the hub, an axle extending thereinto, and having a longitudinal groove, a space being left between the end of said axle and the end of the axle-box, absorbent material located in said space and the longitudinal groove, means removably secured to the axle for preventing longitudinal movement of the hub therein and means for supplying oil to the groove and said space without removing the hub from the axle as and for the purpose specified.

3. In combination, a hub, an axle-box closed at the outer end and open at the inner end secured in the hub, an axle extending thereinto, and having a longitudinal groove, a collar secured to the axle and having an outer face or shoulder abutting the inner end or face of the axle-box and an inner face or shoulder, said collar being further provided with a groove in its inner surface adapted to be in alinement with the groove on the axle, and having a duct leading from said groove to the outer surface of the collar, a nut adapted to screw on said hub and having an internal face or shoulder designed to abut the inner face or shoulder of the collar, and means for supplying lubricant to the groove and duct without removing the hub from the axle as and for the purpose specified.

4. In combination, a hub, an axle-box closed at the outer end and open at the inner end secured in the hub, an axle extending thereinto, and having a longitudinal groove, there being a hole formed through said hub and axle-box near their inner end, an oil-cup secured in said hole, means for preventing longitudinal movement of the hub on the axle, means for carrying the oil from the groove to the bearing-surfaces and means for covering the oil-cup as and for the purpose specified.

5. In combination, a hub, an axle-box closed at the outer end and open at the inner end secured to the hub, an axle extending thereinto, a sheathing or cover for the hub, the inner end thereof extending beyond the end of the hub-body and having an external thread, there being a hole formed through the sheathing, the hub and axle-box near their inner ends, an oil-cup secured in said hole, a collar secured to the axle and having an outer face or shoulder abutting the inner end of the axle-box and an inner face or shoulder, a nut or sleeve adapted to screw on the threaded part of said cover or sheathing and having an internal face or shoulder adapted to abut the inner face or shoulder of the collar, there being a notch or hole formed in the nut and an indicating projection formed on the sheathing opposite the oil-cup as and for the purpose specified.

6. A collar for a device of the class described having an internally-threaded portion and a smooth internal portion of larger diameter than the threaded portion, the external surface of the collar being of two diameters, and having a groove formed in the threaded portion and a duct communicating between said groove and the portion of the outer surface of smaller diameter as and for the purpose specified.

7. A collar for a device of the class described having an internally-threaded portion and an internally smooth portion of greater diameter than the threaded portion, the outer surface of the collar being of two diameters, and having a groove in the threaded portion and a duct communicating between the groove and the portion of the outer surface of smaller diameter and having a circumferential groove formed around the said portion of the collar of smaller diameter in proximity to the oil-duct as and for the purpose specified.

Signed at the town of Bridgewater, Nova Scotia, this 17th day of October, 1902.

WILLIAM L. SAUNDERS.

Witnesses:
WILLIAM BENT FREEMAN,
GEORGE F. ZWICKER.